United States Patent [19]
Hayden, Sr.

[11] Patent Number: 5,832,803
[45] Date of Patent: *Nov. 10, 1998

[54] TOOTH STRUCTURE OF A BANDSAW BLADE

[75] Inventor: Robert C. Hayden, Sr., Branford, Conn.

[73] Assignee: Sandvik AB, Sandviken, Sweden

[ * ] Notice: This patent issued on a continued prosecution application filed under 37 CFR 1.53(d), and is subject to the twenty year patent term provisions of 35 U.S.C. 154(a)(2).

[21] Appl. No.: 701,148

[22] Filed: Aug. 21, 1996

[51] Int. Cl.⁶ .............................. B23D 61/12; B27B 33/02
[52] U.S. Cl. ................................ 83/661; 83/846; 83/850; 83/851
[58] Field of Search .............................. 83/835, 846, 848, 83/849, 850, 851, 852, 661, 854, 855

[56] References Cited

U.S. PATENT DOCUMENTS

| | | | |
|---|---|---|---|
| 105,261 | 7/1870 | Shailer . | |
| 2,568,870 | 9/1951 | Ronan | 83/846 |
| 2,635,327 | 4/1953 | Enlow | 83/850 |
| 2,637,355 | 5/1953 | Chapin | 83/850 |
| 3,973,455 | 8/1976 | Slaats et al. | 83/846 X |
| 4,011,783 | 3/1977 | Mobley | 83/851 X |
| 4,179,967 | 12/1979 | Clark | 83/852 X |
| 4,727,788 | 3/1988 | Yoshida et al. . | |
| 4,784,033 | 11/1988 | Hayden et al. | 83/661 |
| 5,038,653 | 8/1991 | Slocum et al. | 83/846 |
| 5,331,876 | 7/1994 | Hayden, Sr. . | |
| 5,477,763 | 12/1995 | Kullman | 83/851 X |
| 5,603,252 | 2/1997 | Hayden et al. | 83/851 |

FOREIGN PATENT DOCUMENTS

| | | | |
|---|---|---|---|
| 3225596 | 2/1983 | Germany | 83/849 |

*Primary Examiner*—Eugenia Jones
*Attorney, Agent, or Firm*—Burns, Doane, Swecker & Mathis, L.L.P.

[57] ABSTRACT

A bandsaw blade includes recurring groups of cutting tooth structures which are of progressively shorter height from a leading tooth structure to a trailing tooth structure. Each of the tooth structures is either: (A) a single, straight tooth, or (B) a pair of equal-height set teeth which are set to respective sides of the blade. The leading tooth structure consists of a single straight tooth having relatively large chamfers. The last tooth structure consists of a pair of non-chamfered set teeth. The next-to-last tooth structure is either a straight, chamfered tooth or a pair of chamfered, set teeth.

3 Claims, 2 Drawing Sheets

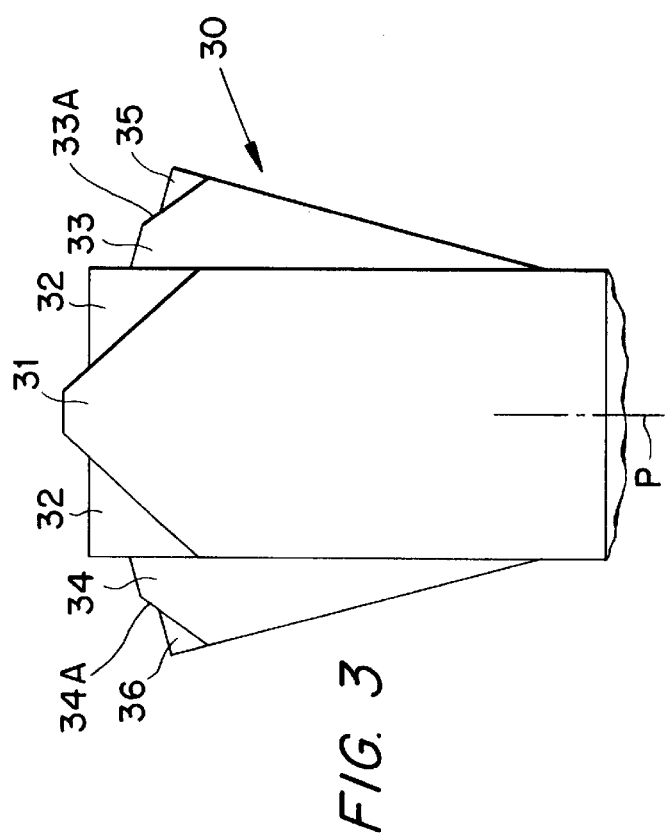
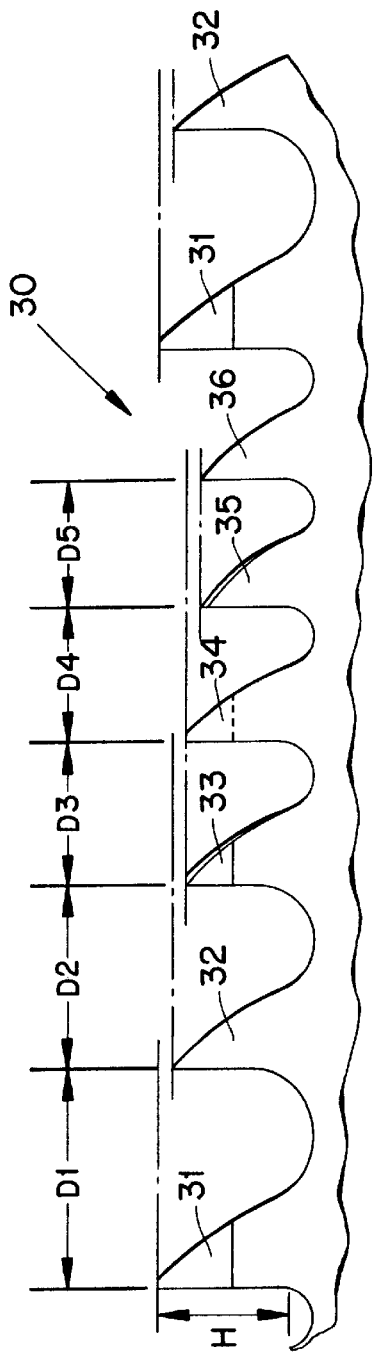

TOOTH STRUCTURE OF A BANDSAW BLADE

BACKGROUND OF THE INVENTION

The present invention relates to a tooth structure of a bandsaw blade.

It has long been known that saw blades with low lateral stiffness, such as bandsaw blades, have a tendency to make crooked cuts, at least when worn, unless the teeth are arranged in recurring groups of unequally shaped teeth. Some teeth in the group are given the task of keeping the saw blade centered, and others the task of defining the width of the cut kerf. Combining these tasks with the desire to have teeth exhibiting high wear resistance and reasonably low cost of manufacture requires compromises and has led to numerous designs of saw blades with recurring groups of teeth, such as those described in U.S. Pat. Nos. 105,261; 4,727,788 and 5,331,876.

It would be desirable to provide a bandsaw blade for metal cutting, fulfilling the same tasks as the blades of the prior art mentioned, but in an even more efficient way.

SUMMARY OF THE INVENTION

The present invention relates to a bandsaw blade comprising recurring groups of tooth structures. Each of the groups includes at least three tooth structures of gradually diminishing height from a leading tooth structure to a last tooth structure. Each tooth structure is one of:

A) a single, straight tooth, and
B) a pair of equal-height set teeth which are set to respective sides of the blade.

A first tooth structure consists of a single, straight tooth which is chamfered at both sides of a top edge thereof. A second of the tooth structures comprises at least one chamfered tooth. A third tooth structure consists of a pair of equal height teeth set to respective sides of the blade and being non-chamfered.

Preferably, the set teeth are set with the same setting angle.

The pair of set teeth of the second tooth structure are preferably spaced apart one behind the other by a pitch distance, and no other successively arranged pair of teeth are spaced apart by a smaller distance.

The spacing between all successively arranged teeth could be identical, or such spacing could become gradually smaller from the leading tooth structure to the last tooth structure.

The tooth of the first tooth structure preferably has a top edge whose length is no longer than one-third of a width of such tooth.

In a case where there are only three tooth structures in the group, the third tooth structure consists of a single, straight tooth having chamfers at both sides of its top edge, each such chamfer being shorter than a respective chamfer of the first tooth structure. Alternatively, the third tooth structure could consist of a pair of equal-height set teeth which are set to respective sides of the blade. Each such set tooth would be chamfered at an outer side of its top edge.

In a case where there are only four tooth structures in the group, the fourth tooth structure would consist of a single, straight non-chamfered tooth situated preferably (but not necessarily) between the leading and next-to-last tooth structures. The third tooth structure would consist of a pair of set teeth which are set to respective sides of the blade, wherein an outer side of a top edge of each of those set teeth would be chamfered.

BRIEF DESCRIPTION OF THE DRAWING

The objects and advantages of the invention will become apparent from the following detailed description of preferred embodiments thereof in connection with the accompanying drawing in which like numerals designate like elements and in which:

FIG. 3 is a view similar to FIG. 1 of a third embodiment of the invention; and

FIG. 4 is a fragmentary side elevational view of the third embodiment shown in FIG. 3.

DETAILED DESCRIPTION OF PREFERRED EMBODIMENTS OF THE INVENTION

Depicted in the figures is a bandsaw blade having recurring groups of teeth. In each of the preferred embodiments of FIGS. 1 and 2, respectively, there are three tooth structures in each group, which are designated hereinafter as first, second and third tooth structures. Those tooth structures can be arranged in any sequence relative to one another, but for optimum performance the first tooth structure should preferably constitute a leading tooth structure, the second tooth structure follows the first tooth structure, and the third tooth structure should preferably constitute a last tooth structure. A "tooth structure" may comprise one or more teeth.

Figure 1:
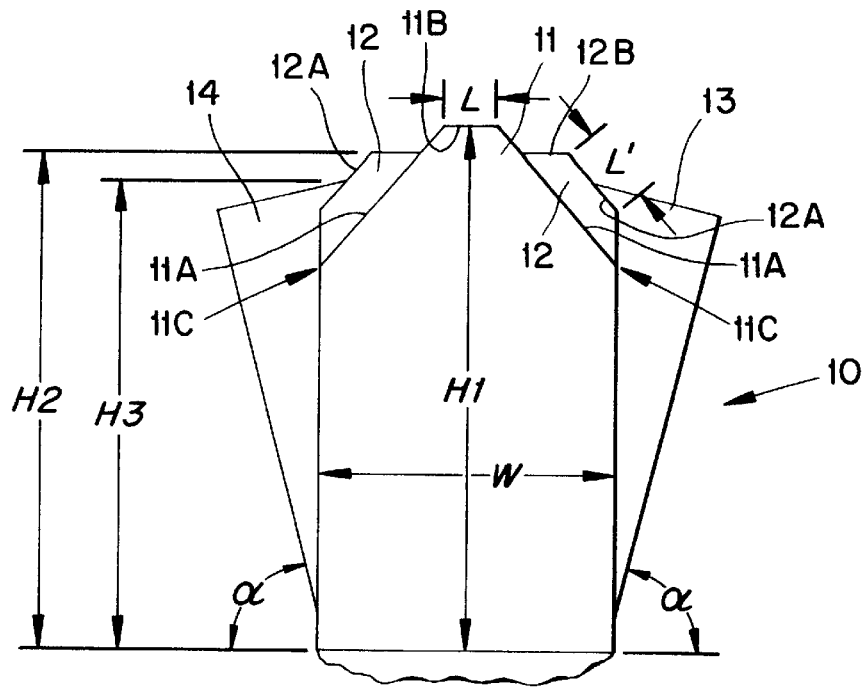
FIG. 1 is a front elevational view of a group of tooth structures on a bandsaw blade according to a first embodiment of the invention, as seen by material about to be cut by those tooth structures.

In FIG. 1, the first tooth structure of a blade 10 is a single, straight (i.e., non-set) first tooth 11 having chamfers 11A at both sides of a top edge 11B thereof. The chamfers 11A are so large that the length L of the top edge 11B is no longer than one-third of the width W of the tooth 11. Lower corners 11C of the chamfers 11A are superimposed in front of the next (second) tooth structure.

That second tooth structure, which preferably constitutes the next-to-last tooth structure of the group, is a single, straight second tooth 12 positioned behind the first tooth 11. The second tooth 12 has the same width W as the first tooth, and the height H2 of the second tooth 12 is less than the height H1 of the first tooth 11. The second tooth has chamfers 12A at both sides of a top edge 12B thereof. Each chamfer 12A is parallel to a respective chamfer 11A of the first tooth and has a length L' no larger than one-half of the corresponding length of its associated chamfer 11A. A "length" of a chamfer as used herein means a distance from one end to the other of the chamfer.

Lower corners of the chamfers 12A are, like the corners 11C, superimposed in front of the next tooth structure.

The third (preferably last), tooth structure comprises a pair of third and fourth teeth 13, 14 which are non-chamfered and are set to respective sides of the blade at the same setting angle α. The effective height H3 of each of the teeth 13, 14 is shorter than the height H2.

From the foregoing it will be appreciated that each group of teeth has three tooth structures of gradually diminishing heights H1, H2, H3. Each tooth structure is one of two types, i.e., (1) a single straight tooth, or (2) a pair of equal-height set teeth which are set to respective sides of the blade. In FIG. 1, the first and second tooth structures 11 and 12, respectively, are of the first type, and the third tooth structure 13, 14, is of the second type. That is, the first tooth structure is a single, straight tooth 11 which is chamfered at both sides of a top edge 11B thereof. The second tooth structure is a chamfered tooth 12. The third tooth structure has a pair of equal-height teeth 13, 14 which are set to respective sides of the blade. Each of the teeth 13, 14 is non-chamfered.

Generally speaking, a tooth (such as the first tooth 11) which is straight, tall, and non-chamfered, will center the blade when entering an already-started, fairly deep kerf, but may actually steer the blade to the side when beginning a new cut. In the present invention, the tooth 11 is straight and tall and possesses large chamfers, i.e., chamfers leaving the top edge 11B with a length no greater than W/3. That ensures that the start of a cut will occur with negligible transverse forces, and thus good centering will result. Also, the wear resistance of the leading tooth 11 is optimized because the lower corners 11C of its chamfers are shielded by being superimposed in front of the second tooth 12 as shown in FIG. 1 (i.e., the corners 11C are situated within the contour of the next tooth 12).

Generally speaking the last tooth structure of a group functions to create the final surfaces of the kerf. To do that with better accuracy, the smallest possible local torsion of the saw blade should preferably occur. This is achieved in the present invention by employing non-chamfered set teeth 13, 14 as the last tooth structure, which teeth create small transverse force components, and by locating those teeth 13, 14 close together (i.e., none of the teeth of the group lie closer together than do the teeth 13, 14 of the third tooth structure).

The second tooth structure 12 is slightly taller (i.e., has a greater height) than the third tooth structure and serves mainly to remove material and limit the load on the last tooth structure. In general, the next-to-last tooth structure of a group is subjected to relatively high cutting forces, and thus is subject to relatively rapid wear. In the present invention, the second tooth structure 12 is the next-to-last tooth structure, and its wear resistance is maximized by means of the chamfers 12A.

Figure 2:
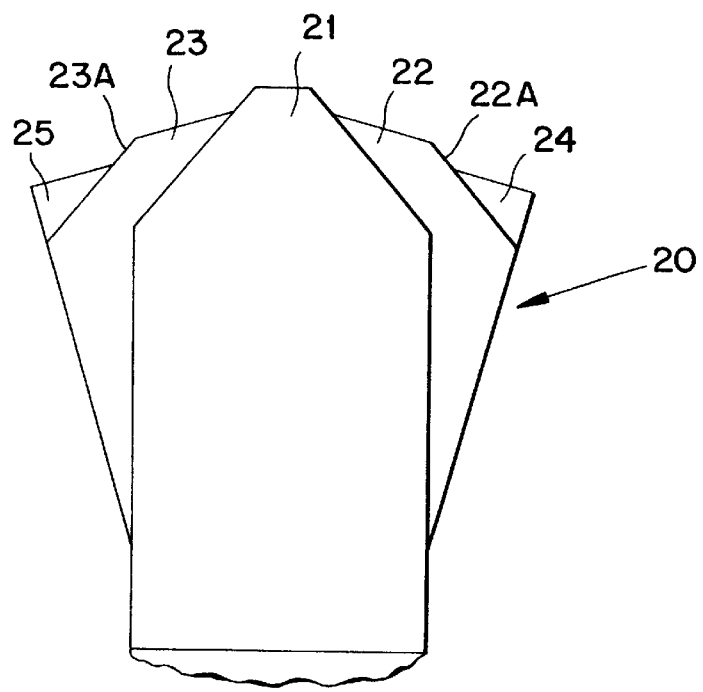
FIG. 2 is a view similar to FIG. 1 of a second embodiment of the invention.

As shown in FIG. 1 the second tooth structure is a single tooth 12. Alternatively, however, the second tooth structure could comprise two set teeth 22, 23 as shown in FIG. 2. That is, in a bandsaw blade 20 shown in the embodiment of FIG. 2, the first tooth structure (tooth 21), and the third tooth structure (teeth 24, 25) of FIG. 2 correspond to the first and third tooth structures, respectively, of FIG. 1. The second tooth structure of FIG. 2, comprises the two set teeth 22, 23 which are set to respective sides of the blade at equal setting angles. Each of the set teeth 22, 23 has a chamfer 22A, 23A at an outer side of its top edge.

In a third embodiment of the invention, shown in FIG. 3, a bandsaw blade 30 has recurring groups of teeth, wherein each group has four tooth structures. A first tooth structure is a straight chamfered tooth 31. A second tooth structure has two chamfered set teeth 33, 34 (i.e., each tooth 33, 34 having a chamfer 33A, 34A at an outer side of its top edge). A third tooth structure has two non-chamfered set teeth 35, 36. A fourth tooth structure is a single, straight non-chamfered tooth 32 which is of shorter height than the tooth 31 of the first tooth structure and has the same width thereas. Each of the straight teeth 31, 32 is substantially symmetric about a center plane P of the blade body as is evident from FIG. 3. It is desirable that a straight tooth without chamfers be preceded by a straight tooth with chamfers.

FIG. 4 shows a side view of the group of teeth shown in FIG. 3, with the tooth height becoming progressively lower for each successive tooth structure. However, in the case of each tooth structure comprised of two set teeth, the set teeth are of equal height. The pitch distances (i.e., front-to-rear distances) D1–D5 between successive teeth vary within the group and are shortest between the teeth 35, 36 of the last tooth structure. That is, no other successive pair of teeth are closer together than the teeth 35, 36. A similar arrangement of pitch distances could be provided in the embodiments of FIGS. 1 and 2, respectively. Varying the pitch distance between successive teeth will reduce the noise and vertical vibrations of the saw in operation, but makes maintenance more difficult.

The bandsaw blade according to the invention should preferably have teeth with tips (not shown) made from harder material than the blade body, such as high-speed-steel or sintered carbide, while the blade body should be made of an alloy with good ability to withstand the bending over the drive pulleys, such as a low alloy tool steel.

For best precision in manufacture and maintenance, all of the set teeth should have the same setting angle and the same starting level of the setting. The chamfers on the next-to-last tooth structure should be so large that the outer corners of those teeth are superimposed in front of the teeth of the last tooth structure, and in FIGS. 2 and 3 the setting width of the teeth of the next-to-last tooth structure should be less than that of the teeth of the last tooth structure.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims be embraced thereby.

What is claimed is:

1. A bandsaw blade comprising a blade body and recurring groups of six teeth projecting from the blade body, each tooth including a tip formed of a harder material than the blade body, each group of teeth comprising:

a first straight tooth constituting a leading tooth of the group and arranged substantially symmetrically with respect to a center plane of the blade body, the first straight tooth having a top edge with two chamfered corners;

a second straight tooth arranged substantially symmetrically with respect to the center plane and being of shorter height than the first tooth;

a first pair of equal-height set teeth of less height than the first straight tooth and set to opposite respective sides of the blade body by equal setting angles, each of the first pair of set teeth having a top edge forming a non-chamfered outer corner disposed laterally outside of a respective side of the blade body; and a second pair of equal-height set teeth of less height than the first straight tooth and of greater height than the first pair of set teeth, the second pair of set teeth being set to opposite respective sides of the blade body by equal setting angles which are equal to the setting angles of the first pair of set teeth, each of the second pair of set teeth having a top edge forming a chamfered outer corner disposed laterally outside of a respective side of the blade body.

2. The bandsaw blade according to claim 1 wherein the second straight tooth is of the same width as the first straight tooth, the second straight tooth having a top edge forming two non-chamfered corners.

3. The bandsaw blade according to claim 1 wherein the second straight tooth is disposed behind the first straight tooth; the second pair of set teeth being disposed behind the second straight tooth; and the first pair of set teeth being disposed behind the second pair of set teeth.

* * * * *